United States Patent [19]

Kass

[11] Patent Number: 5,687,342
[45] Date of Patent: Nov. 11, 1997

[54] MEMORY RANGE DETECTOR AND TRANSLATOR

[75] Inventor: William J. Kass, Easley, S.C.

[73] Assignee: NCR Corporation, Dayton, Ohio

[21] Appl. No.: 761,610

[22] Filed: Sep. 18, 1991

[51] Int. Cl.$^6$ ................................................. G06F 12/02
[52] U.S. Cl. .................................... 395/411; 345/412
[58] Field of Search .................................... 395/400, 425

[56] References Cited

U.S. PATENT DOCUMENTS

| | | | |
|---|---|---|---|
| 3,813,652 | 5/1974 | Elmer et al. | 395/419 |
| 4,025,903 | 5/1977 | Kaufman et al. | 395/405 |
| 4,400,794 | 8/1983 | Koos | 395/412 |
| 4,414,627 | 11/1983 | Nakamura | 395/412 |
| 4,571,676 | 2/1986 | Mantellina et al. | 395/497.03 |
| 4,727,475 | 2/1988 | Kiremidjian | 395/284 |
| 4,860,252 | 8/1989 | Sukara | 395/405 |
| 4,922,451 | 5/1990 | Lo et al. | 395/182.06 |
| 4,980,850 | 12/1990 | Morgan | 395/497.03 |
| 5,119,486 | 6/1992 | Albonesi | 395/497.03 |

Primary Examiner—Jack A. Lane
Attorney, Agent, or Firm—James M. Stover

[57] ABSTRACT

A split-range address detector and translator for interfacing a system processor with a memory array. The split-range detector generates a select signal for the memory array whenever an input address received from the system processor resides in either of two, non-contiguous, address ranges. The split-range detector includes a first range detector which generates a first range detection signal when the address received from the system processor is within a first, lower, range of addresses, and a second range detector which generates a second range detection signal when the input address is within a second, upper, range of addresses. The output signals are combined together to produce the select signal for the memory array. The address ranges are defined by upper and lower address limits stored within programmable registers. The address translator includes subtraction logic which determines the size of the address gap between the two address ranges from the stored address limits and generates a translated address by subtracting the size of the address gap from the input address. A bus multiplexer responsive to the second range detection signal provides the input address information to the memory array when the input address is within the lower address range and provides the translated address to the memory array when the input address is within the upper range of addresses. Thus, addresses received from the system processor are mapped into a single contiguous address space within the memory array.

8 Claims, 2 Drawing Sheets

MEMORY RANGE DETECTOR AND TRANSLATOR

The present invention relates to computer memory and, more particularly, to an address detection and translation scheme for memory systems employing discontinuous memory address mapping.

BACKGROUND OF THE INVENTION

Early personal computers, such as the IBM PC and PC/XT, had a maximum system physical address space of one megabyte corresponding to a twenty-bit wide address bus. In other words, the twenty-bit wide address bus limited the computer to an addressing capability of one megabyte, or $2^{20}$ bytes. The architecture of these early personal computers required that primary system memory, or RAM (random access memory), be contiguous and was located in the lower portion, i.e. the first 640 kilobytes, of the system address space. The address space beginning at 640 kilobytes was reserved for memory-mapped input/output devices such as video frame buffers, peripheral board ROMs (read only memory) and ROM BIOS (read only memory basic input/output system). The system memory map, which illustrates the functional divisions of the system address space, is shown in FIG. 1.

Although later generation personal computers, such as those incorporating Intel Corporation 80286 and 80386 microprocessors, can address more than one megabyte of memory, the memory map of FIG. 1 has been carried forward to permit compatibility with the prior computer architectures and existing computer applications and operating systems. For these later generation personal computers, memory mapping for RAM in addition to 640 KB begins at one megabyte.

The density and capacity of the primary memory devices employed within personal computers and other electronic devices have increased substantially in recent years and continue to increase. This increase in memory capacity has been accompanied by the development of equipment and applications requiring greater memory capacities. However, as memory density increases it becomes increasingly difficult to arrange physical memory chips into arrays that leave the gaps in the system memory map that are necessary without wasting portions of the memory that are physically present but not allowed to be accessed. For example, with new technology four-megabit DRAMs memory boards can be constructed utilizing one DRAM per data bus to provide a memory array of sixteen megabytes.

Difficulties in addressing the sixteen-megabyte board and utilizing the full amount of memory residing on the board are presented when this board is installed as the primary memory within a personal computer employing the memory map of FIG. 1, Normally a memory board designed to be plugged into a computer includes either a set of switches or a programmable register for identifying the address range to which the memory board will respond. Addressing the sixteen-megabyte board described above is complicated because a single address range to which the board responds can not be specified. The board must respond to system addresses from zero up to 640 KB and from one MB to sixteen MB. Also, a straight translation of system address space to memory board array addresses would result in the non-utilization of 384 KB of physical memory because of the gap between 640 KB and one MB (1024 KB) in the system memory map.

OBJECTS OF THE INVENTION

It is therefore an object of the present invention to provide a new and useful range detection scheme for a memory array.

It is another object of the present invention to provide a new and useful translation scheme for a memory array.

It is yet another object of the present invention to provide a multiple-range detection scheme for a memory board such that the board is responsive to system addresses included within two or more preselected address ranges.

It is still a further object of the present invention to provide such a multiple-range detection scheme including a translation scheme for mapping non-contiguous system addresses to contiguous addresses within the memory board.

It is an additional object of the present invention to provide a new and useful range detection and address translation circuit for a computer primary memory providing address detection for two non-contiguous system address ranges and translation of non-contiguous system addresses to contiguous addresses within the memory.

SUMMARY OF THE INVENTION

There is provided, in accordance with the present invention, a split-range address detector and translator for interfacing a system processor with a memory array. The split-range detector includes a first range detector for receiving an input address from the system processor and generating a first range detection signal when the received address is within a first, lower, range of addresses, and a second range detector which also receives the input address and generates a second range detection signal when the input address is within a second, upper, range of addresses. The two output signals are combined together to produce a select signal for the memory array. The address translator is connected to receive the second range detection signal and the input address. The translator generates a translated address by subtracting a predetermined value from the input address. The state of the second range detection signal determines whether the unaltered input address or the translated address is provided as an output to the memory array. The translated address is provided to the memory array when the input address is contained within the upper range of addresses.

In the described embodiment, the first range detector consists of a first comparator having a first input for receiving the input address and a second input for receiving a first range limit value. The comparator provides a HIGH state output signal, i.e. the first range detection signal, when the input address is less than the first range limit value.

The second range detector includes a second comparator having a first input for receiving the input address and a second input for receiving a second range limit value which provides a HIGH state output signal when the input address is greater than or equal to the second range limit value. A third comparator having a first input for receiving the input address and a second input for receiving a third range limit value provides a HIGH state output signal when the input address is less than the third range limit value. An AND gate combines the outputs of the second and third comparator to produce the second range detection signal. The two range detection signals are combined through an OR gate to generate the select signal for the memory array.

The address translator includes a first subtractor having a first input for receiving the second range limit value and a second input for receiving the first range limit value which generates an address offset value equivalent to the difference between the first and second range limit values. A second subtractor having a first input for receiving the input address and a second input for receiving the address offset value generates the translated address. A bus multiplexer having a first input for receiving the first address, a second input connected to receive the translated address, and a select input connected to receive the second range detection signal provides address information to the memory array.

The above and other objects, features, and advantages of the present invention will become apparent from the following description and the attached drawings.

DETAILED DESCRIPTION OF THE PREFERRED EMBODIMENT

Figure 2:
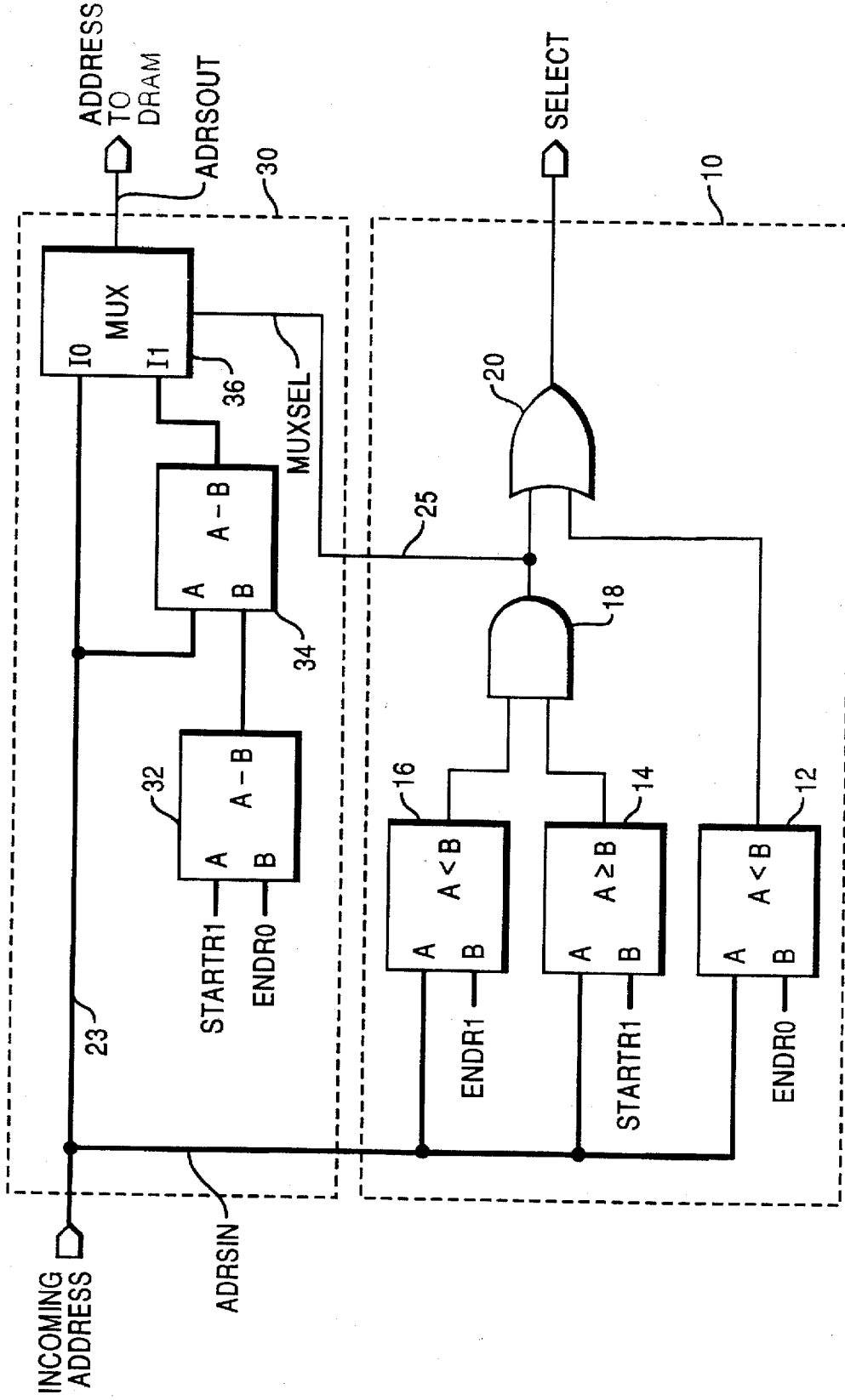
FIG. 2 is a block diagram illustration of a range detection and address translation circuit in accordance with the present invention.

A dual or split range detector and address translator circuit that allows a memory board to respond to a first, zero to x, address range; ignore a defined range of addresses between x and y; and respond to a second, y to z, address range is shown in FIG. 2. The circuit includes two major sections, a split range detector 10 and an address translator 30.

Range detector 10 includes three bus comparators, identified by reference numerals 12, 14 and 16. Each comparator is connected to receive address information, referred to as ADRSIN, from the system processor (not shown) via address bus 23. Comparator 12 is also connected to receive a user specified address value ENDR0 which defines the ending address for the first, or lower, address range. The single-bit output of comparator 12 is set to a logic 1 state when ADRSIN is less than ENDR0 and set to a logic 0 state otherwise. Comparator 14 receives a user set address value STARTR1 which specifies the starting address for the second, or upper, address range. The output of comparator 14 is set to a logic 1 state when ADRSIN is greater than or equal to STARTR1 and set to a logic 0 state otherwise. Comparator 16 is connected to receive address value ENDR1, specifying the ending address for the second address range. The output of comparator 16 is set to a logic 1 when ADRSIN is less than ENDR1 and set to a logic 0 state otherwise.

The outputs of comparators 14 and 16 are provided to a two-input AND gate 18. The output of gate 18 is provided to one input terminal of a two-input OR gate 20 and also to address translator 30. The remaining input terminal of gate 20 is connected to the output terminal of comparator 12. The output terminal of OR gate 20 provides the output of split range detector 10, identified as signal SELECT.

Address translator 30 includes a subtractor 32 which is connected to receive address values STARTR1 and ENDR0 and generate an output equal to the difference STARTR1 minus ENDR0. This difference and incoming address signal ADRSIN are provided to the input terminals of a second subtractor 34. Subtractor 34 generates an output value equal to ADRSIN−(START1−ENDR0). Address signal ADRSIN and the output of subtractor 34 are provided to corresponding inputs of a 2:1 bus multiplexer 36. The address provided at the output of multiplexer 36 is selected in response to the output of AND gate 18, referred to as MUXSEL.

Address values ENDR0, STARTR1 and ENDR1, which define the end of the lower address range and the start and end of the upper address range, respectively, are contained within programmable registers, not shown.

Figure 1:
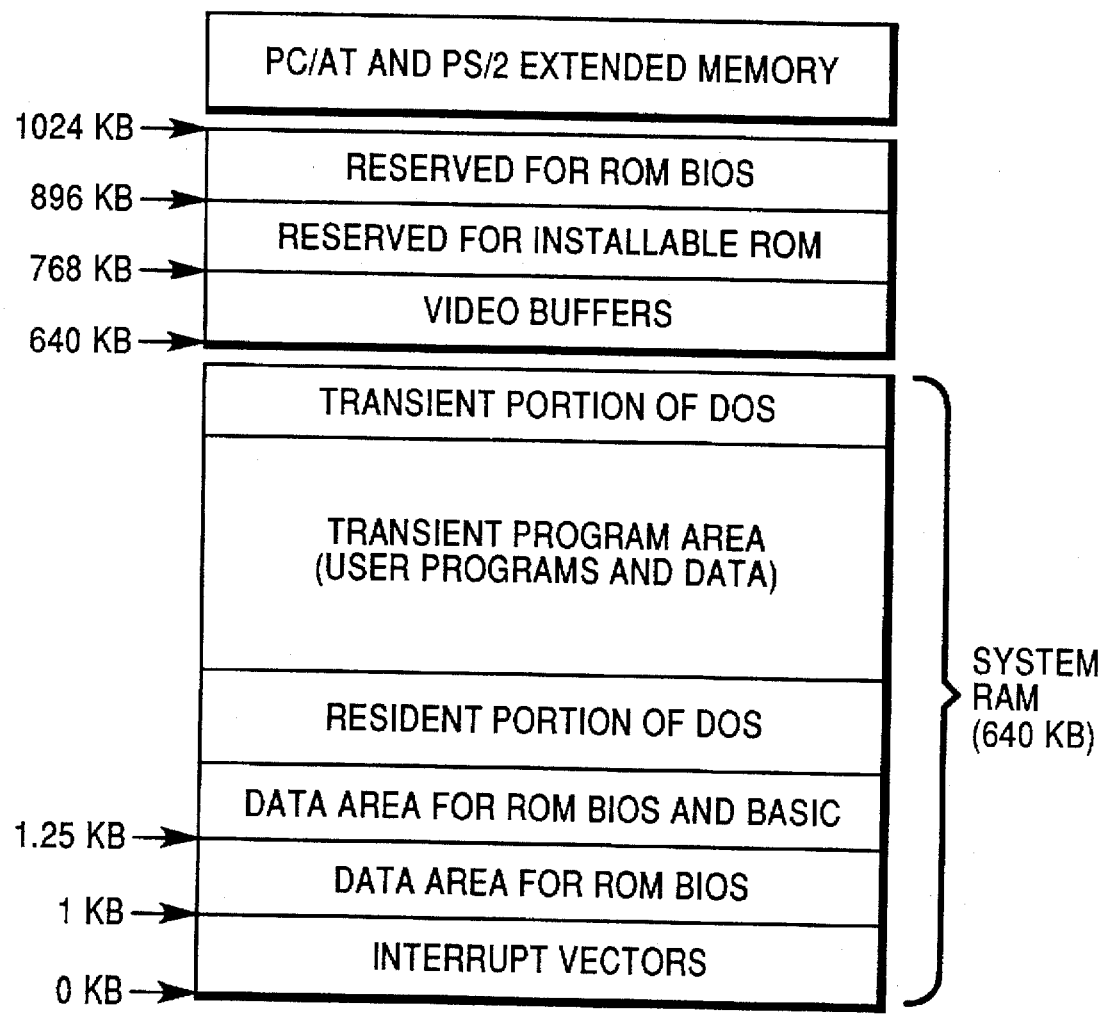
FIG. 1 is a system memory map illustrating the memory usage in personal computers.

In operation, the programmable registers are loaded by the system user with the address values defining the lower and upper address ranges to which the memory board is to respond. For example, an eight-megabyte memory board within a system having a system memory map as shown in FIG. 1 would require the following values for ENDR0, STARTR1 and ENDR1:
ENDR0=640 KB,
STARTR1=1024 KB, and
ENDR1=8576 KB.
The value of 8576 KB for ENDR1 was determined by adding 384 KB, the amount of system address above 640 KB which is reserved for addressing video frame buffers, ROM and ROM BIOS, to eight MB (8192 KB). Thus two address ranges are defined, the lower range including the first 640 KB of the system memory map and the upper range comprising 7552 KB (eight MB less 640 KB) beginning at system address 1024 KB.

Addresses received from the system processor via bus 23 are thereafter compared to address values ENDR0, STARTR1 and ENDR1 to determine if an address on the memory board is being addressed. Board select signal SELECT is set to a logic 1 when the incoming address, ADRSIN, is less than 640 KB, or from 1024 KB up to, but not including, 8576 KB. Multiplexer select signal MUXSEL is set to a logic 1, activating the address translation feature of the present invention, when ADRSIN is from 1024 KB up to 8576 KB.

Within address translator 30, subtractor 32 determines the address offset required to adjust system addresses within the upper range to memory board addresses. Continuing with the present example, the output of subtractor 32 is 384 KB. Subtractor 34 reduces the system address received from bus 23 by the amount of the address offset, e.g. 384 KB.

Multiplexer 36 provides the system address, ADRSIN, to the memory board DRAMs when signal MUXSEL is at a logic 0 state. The translated address, ADRSIN less 384 KB, is provided to the memory board DRAMS when MUXSEL is at a logic 1 state, i.e. when ADRSIN is identified by the range detection circuitry as being within the upper address range.

The operation of the range detector and translator circuits described above is summarized in the table which follows.

| Incoming Address | SE-LECT | MUX-SEL | Outgoing Address |
|---|---|---|---|
| 0 ≦ ADRSIN < ENDR0 | 1 | 0 | ADRSIN |
| ENDR0 ≦ ADRSIN < STARTR1 | 0 | 0 | — |
| STARTR1 ≦ ADRSIN < ENDR1 | 1 | 1 | ADRSIN − (STARTR1 − ENDR0) |
| ADRSIN ≧ ENDR1 | 0 | 0 | — |

The address translation circuitry is constructed to provide quick translation of address information, adjusting the incoming address for the upper range at the same time the address detection circuit is determining the range of the incoming address. This is accomplished by calculating the address offset from the static values ENDR0 and STARTR1 prior to address detection. Subtractor 34 adjusts incoming addresses as they are received from the system processor contemporaneously with range detection. Upon completion of range detection, multiplexer 36 provides either the incoming address or the result of subtractor 34 as the address to be supplied the board memory array.

It can thus be seen that there has been provided by the present invention a simple multiple-range detection and address translation circuit for detection of non-contiguous system address ranges and mapping of non-contiguous system addresses to contiguous addresses within the memory board.

Although the presently preferred embodiment of the invention has been described, it will be understood that various changes may be made within the scope of the appended claims. For example, the address ranges described above are provided for illustration only. Address ranges other than zero to 640 KB and one MB to eight MB may be specified by the system administrator. In addition, an address decoder/translator responsive to more than two address ranges and providing different translations for each range may easily be constructed from the above teaching.

What is claimed is:

1. A circuit for interfacing first and second devices within a computer system, comprising:

a first range detector for receiving an input address from said first device and responsive thereto to generate a first range detection signal when said address is within a first predetermined range of addresses, said first predetermined range of addresses including address values which are less than a first range limit value;

a second range detector for receiving said input address from said first device and responsive thereto to generate a second range detection signal when said input address is within a second predetermined range of addresses, said second predetermined range of addresses including address values between a second range limit value and a third range limit value, said second range limit value being greater than said first range limit value and said third range limit value being greater than said second range limit value;

OR logic connected to receive and combine said first and second range detection signals to generate a select signal for said second device; and address conversion logic connected to receive said first range limit value, said second range limit value, said second range detection signal and said input address, said conversion logic being responsive to said second detection signal to generate an output address for said second device, wherein said output address is generated by determining the difference between said first and second address range limit values and subtracting this difference from said input address.

2. The circuit according to claim 1, wherein:

said first range detector comprises:

a first comparator having a first input for receiving said input address and a second input for receiving said first range limit value, said first comparator providing a HIGH state output signal when said input address is less than said first range limit value; and said second range detector comprises:

a second comparator having a first input for receiving said input address and a second input for receiving said second range limit value, said second comparator providing a HIGH state output signal when said input address is greater than or equal to said second range limit value;

a third comparator having a first input for receiving said input address and a second input for receiving said third range limit value, said third comparator providing a HIGH state output signal when said input address is less than said third range limit value; and an AND gate having a first input connected to receive the output of said second comparator and a second input connected to receive the output of said third comparator, the output of said AND gate comprising said second range detection signal.

3. The circuit according to 2, wherein said address conversion logic comprises:

a first subtractor having a first input for receiving said second range limit value and a second input for receiving said first range limit value, said subtractor generating an address offset value equivalent to said second range limit value less said first range limit value; and a second subtractor having a first input for receiving said input address and a second input for receiving said address offset value, said second subtractor generating an output equivalent to said input address less said address offset value.

4. The circuit according to claim 3, wherein said address conversion logic further includes:

a bus multiplexer having a first input for receiving said first address, a second input connected to receive the output from said second subtractor, and a select input connected to receive said second range detection signal, the output of said multiplexer comprising said output address;

wherein said multiplexer provides as said output address the output of said second subtractor upon receipt of said second range detection signal.

5. A multiple-range detector circuit comprising:

a first range detector for receiving an address and responsive thereto to generate a first range detection signal when said address is within a first predetermined range of addresses, said first predetermined range of addresses including address values which are less than a first range limit value;

a second range detector for receiving said address and responsive thereto to generate a second range detection signal when said address is within a second predetermined range of addresses, said second predetermined range of addresses including address values between a second range limit value and a third range limit value, said second range limit value being greater than said first range limit value and said third range limit value being greater than said second range limit value; and OR logic connected to receive said first and second range detection signals for combining said detection signals to generate a select signal.

6. The range detector according to claim 5, wherein:

said first range detector comprises:

a first comparator having a first input for receiving said input address and a second input for receiving said first range limit value, said first comparator providing a HIGH state output signal when said input address is less than said first range limit value;

said second range detector comprises:

a second comparator having a first input for receiving said input address and a second input for receiving said second range limit value, said second comparator providing a HIGH state output signal when said input address is greater than or equal to said second range limit value;

a third comparator having a first input for receiving said input address and a second input for receiving said third range limit value, said third comparator providing a HIGH state output signal when said input address is less than said third range limit value; and an AND gate having a first input connected to receive the output of said second comparator and a second input connected to receive the output of said third comparator, the output of said AND gate comprising said second range detection signal.

7. A memory range detector and translator for interfacing a system processor with a memory array, comprising:

a first comparator having a first input for receiving an input address from said system processor and a second input for receiving a first range limit value, said first comparator providing a HIGH state output signal when said input address is less than said first range limit value;

a second comparator having a first input for receiving said input address and a second input for receiving a second range limit value, said second comparator providing a HIGH state output signal when said input address is greater than or equal to said second range limit value;

a third comparator having a first input for receiving said input address and a second input for receiving a third range limit value, said third comparator providing a HIGH state output signal when said input address is less than said third range limit value; and an AND gate having a first input connected to receive the output of said second comparator and a second input connected to receive the output of said third comparator;

an OR gate having a first input connected to receive the output of said first comparator and a second input connected to receive the output of said AND gate for generating a select signal for said memory array;

a first subtractor having a first input for receiving said second range limit value and a second input for receiving said first range limit value, said subtractor generating an address offset value equivalent to said second range limit value less said first range limit value; and a second subtractor having a first input for receiving said input address and a second input for receiving said address offset value, said second subtractor generating an output equivalent to said input address less said address offset value; and a bus multiplexer having a first input for receiving said input address, a second input connected to receive the output from said subtractor, and a select input connected to receive the output of said AND gate, said multiplexer providing said input address to said memory array upon receipt of a LOW state output signal from said AND gate and providing the output of said second subtractor to said memory array upon receipt of a HIGH state output signal from said AND gate.

8. In a computer system including a system processor and a memory array, a method for translating a first address provided by said processor for transmission to said memory array, the steps comprising:

generating a second address differing from said first address by a predetermined value; and providing said first address to said memory array when said first address is within a first predetermined range of addresses, said first predetermined range of addresses including address values which are less than a first range limit value, and providing said second address to said memory array when said first address is within a second predetermined range of addresses, said second predetermined range of addresses including address values between a second range limit value and a third range limit value, said second range limit value being greater than said first range limit value and said third range limit value being greater than said second range limit value; and wherein said step of generating said second address comprises the steps of determining the size of the address gap separating said first and second address ranges by calculating the difference between said first and second range limit values; and reducing said first address by the size of said address gap to generate said second address.

* * * * *